United States Patent [19]
Roth

[11] Patent Number: 5,188,317
[45] Date of Patent: Feb. 23, 1993

[54] SEISMIC CONNECTOR WITH RETAINING CLIP

[76] Inventor: Steven A. Roth, 2891 Danville Blvd., Alamo, Calif. 94507

[21] Appl. No.: 802,651

[22] Filed: Dec. 6, 1991

[51] Int. Cl.⁵ .............................................. E21F 17/02
[52] U.S. Cl. ........................................ 248/59; 248/62
[58] Field of Search ............... 248/58, 59, 62, 65, 248/68.1, 74.1; 403/243, 262, 260; 52/27

[56] References Cited

U.S. PATENT DOCUMENTS

| | | | |
|---|---|---|---|
| Re. 14,554 | 11/1918 | Grubbs | 403/260 X |
| D. 246,346 | 11/1977 | Strunk | D8/354 |
| D. 285,647 | 9/1986 | Sachs | D8/356 |
| 656,686 | 8/1900 | Wolf | 403/260 |
| 1,835,078 | 12/1931 | Ornberg | 248/65 |
| 2,146,539 | 2/1939 | Hahn et al. | 189/37 |
| 2,231,462 | 2/1941 | Cobb | 248/58 |
| 2,535,427 | 12/1950 | Kindorf | 248/68.1 |
| 3,377,038 | 4/1968 | Loudon | 248/59 |
| 3,866,871 | 2/1975 | Dupuy | 248/68.1 X |
| 3,918,322 | 11/1975 | Frier | 403/260 X |
| 4,063,700 | 12/1977 | Brewer | 248/62 |
| 4,065,218 | 12/1977 | Biggane | 403/71 |
| 4,078,752 | 3/1978 | Kindorf | 248/62 |
| 4,524,936 | 6/1985 | Hurtubise | 248/62 |
| 4,637,175 | 1/1987 | Froening et al. | 52/27 |
| 4,673,151 | 6/1987 | Pelz | 248/74.1 |
| 4,714,219 | 12/1987 | Mayse | 248/65 |
| 5,007,603 | 4/1991 | Kirschner | 248/59 |
| 5,024,580 | 6/1991 | Olive | 403/260 X |

*Primary Examiner*—J. Franklin Foss
*Attorney, Agent, or Firm*—Glen R. Grunewald

[57] ABSTRACT

A lateral brace for a hanger suspended from a rod for pipes, electric cables or the like, the lateral brace having two, slotted interlocking pieces which interlock when slots open in opposite directions so that the two interlocked pieces can form a hole surrounding the rod and thereby brace it to a structure without removing a hanger from its supporting rod.

5 Claims, 4 Drawing Sheets

SEISMIC CONNECTOR WITH RETAINING CLIP

FIELD OF THE INVENTION

The present invention is directed toward support systems to suspend electrical conduit and mechanical piping systems from overhead structures and more particularly to seismic restraints for bracing these systems against oscillation.

BACKGROUND OF THE INVENTION

In many building structures, electrical conduit and mechanical piping systems for carrying wires and cables, such as electrical cables and communication wires, fluids, such as hot and cold water, steam, oil, compressed air and the like are suspended from the ceiling or from beams in the structure. The conduit or piping is usually maintained by conduit trapeze supports and hangers which are suspended from the ceiling by rods or threaded bolts. The trapeze supports and hangers generally are spaced about 8 to 12 feet apart depending on the material from which the conduit and piping is made, and the structural demands on the conduit or piping with regard to the cable requirements, such as the number of cables and their requisite gauge, and the fluid properties, such as density, pressure and temperature of the fluid in the pipe.

It follows from this suspended arrangement that the electrical and mechanical systems have a potential to oscillate in the longitudinal and transverse direction. It is desired that these systems be able to oscillate slightly to prevent damage to the ceiling or beam structure supporting the systems and to the system itself. For example, if the systems were rigorously braced against oscillation, the connection joints between each segment of conduit and piping and the trapeze and hanger assemblies could potentially be damaged producing undesirable and possible undetectable results. However, if the systems are not braced against most of the potential to oscillate to considerably dissipate the energy causing the oscillation, the system can possibly oscillate to a destructive frequency and even to the resonant frequency of the structure supporting the system and of the system itself, thereby, causing damage to the structure and the system. For this purpose, the systems are braced against unintentional external forces causing the system to oscillate; for example, the external forces may be caused by earthquakes, building sway and machinery. To address the safety demands, state legislation have set safety requirements under which suspended systems including bracing assemblies must meet.

It is found in practice that these systems are suspended from the ceiling or beam structure by a rod. At the free end of each rod is fastened the trapeze support or the hanger, such as a clevis hanger or J-hanger from which the conduit and piping is carried. As mentioned, the trapeze supports and hangers are maintained along their system at predetermined distances between 8 to 12 feet apart.

It is further found in practice that a brace is employed to prevent oscillation. The brace extends from the trapeze or the hanger at an angle upward to the overhead structure or ceiling. The brace includes a bracket to attach to the ceiling and a connector to attach to the suspended system wherein the two may be connected integrally with each other or by a channel or cable extending therebetween. The connector is provided with a hole through which the rod suspending the system must extend. It is obvious then that the trapeze or the hanger would at least have to be unsupported for a period to insert the rod through the hole of the connector. Commonly the trapeze would have to be disassembled or the hanger would have to be removed in order to extend the rod through a hole in the connecter.

This raises a problem when attaching the connector to an already installed suspended system. Here, the installer is required to disassemble each trapeze support and remove each hanger at the location where the brace is being installed. This requires unnecessary costs and increased safety risks to the installer. The installer must work at the brace installation location with the system unsupported or alternatively provide additional support either from the ceiling or from the ground to support the system when it is detached from the rod and support. Further, the installer is restricted in the number of braces which can be affixed to the system at one time because the entire system cannot be disconnected from the overhead structure. This additional labor increases installation time and cost. Thus, the post system installation bracing can become very dangerous and labor intensive resulting in an avoidable expensive installation.

Other prior connectors are either secured directly to the mechanical piping or electrical conduit member or welded directly to the rod suspending the system. Attaching the connector directly to the piping or conduit is undesirable because it can cause damage to the system by providing too much bracing along the piping or conduit. Additionally, this practice positions bracing at areas other than the hanger area which has already overhead structure area dedicated to suspend support members, and these other locations may not have overhead structure members to suspend these braces. Welding the connector also is an undesirable connector because is it labor intensive and unsafe.

Accordingly, it is the primary aim of this invention to provide a connecter which can be attached to the system without disassembling or removing the trapeze or hanger. A further object is to provide a connector which is safer and more efficient to install.

A resulting object is to provide a connector which reduces the labor and associated costs.

Finally, a related object is to provide a uniform connector which is convenient to use.

SUMMARY OF THE INVENTION

The method and apparatus of the present invention relates to bracing which is applied to the hanging support systems for utility and service lines to prevent or eliminate the oscillations that develop in such hanging systems when subjected to earthquakes or various types of natural or man made vibration forces. Such support systems use elongated threaded support rods to which this bracing is applied. The brace of the present invention easily and safely attaches to an already installed system. The brace generally extends at an angle upward and away from a lower end of the threaded support rod to a location on the overhead structure.

The preferred connector has a rectangular configuration which is bent at a predetermined angle into two sections along a bend line parallel and intermediate the distal edges. A first section is designed to attach the connector to the brace to transmit any external force acting on the system at angle to the overhead structure. The second section of the connector has a connector slot to receive the rod therein. When the connector is in use, a retaining clip is associated with the connector slot to maintain the rod in the connector slot and thus fasten the connector to the rod. To accomplish this closure, the retaining clip has a rod retaining slot which is overlaid on the connector slot to form an aperture through which the rod extends. In this overlay position, the connector slot of the connector and the retaining slot of the retaining clip are oriented with their respective slots facing in opposite directions. The retaining clip and the connector slot containing section of the connector are plate like members; thus when the retaining slot is overlaid on the connector slot, a surface of the retaining clip is placed in engagement with a surface of the connector.

The retaining clip has a rectangular or square planar shape with the retaining slot having its opening on a first edge and extending inward toward the center of the retaining clip. To supply an interlocking engagement between the connector and the retaining clip to maintain accurately the aperture, at least one edge, other that the edge having the retaining slot, is provided with an angle tab. The angle tab has a rectangular shape which angles out of the retaining clip plane from a location intermediate and parallel to the edge from which it is formed and to the retaining slot. The width of the angle tab generally is less than half the length of its forming edge and has a length equal to the distance between the intermediate location and the same forming edge.

To cooperate with the angle tab in this interlocking engagement, the connector has at either edge adjacent the connector slot a tab receiving slot having similar shape as the angle tab of the retaining clip to receive in a tight fit manner the angle tab of the retaining clip to lock the connector and the retaining clip together accurately to maintain the formed aperture.

It is however preferred that the interlocking engagement include three angle tabs formed from the retaining clip as already described and to be received by the connector in a tight fit fashion. In this interlocking engagement, the retaining clip has a pair of angle tabs each formed at opposite edges which are both adjacent the rod retaining slot, and a third angle tab located at the edge opposite the rod retaining slot. The connector is formed with a pair of tab receiving slot at edges which are opposite and adjacent the connector slot to receive the pair of tabs located on edges adjacent the rod retaining slot of the retaining clip. The third angle tab of the retaining clip is received by a portion of the rod receiving slot which is not occupied by the rod, and this tab is generally wider then the other two tabs to insure that the retaining clip is installed in the correct orientation having the retaining slot and receiving slot facing in opposite directions and because the rod receiving slot is generally wider.

The connector is used to easily and quickly fasten a brace to an already installed suspended system without having to remove or disassemble the support and without having to support the system with external supports during installation of the brace. In a common suspended system, the rod extends through a hole in one of the support's structure members, and a pair of nuts secure and position the support along the rod. A first nut is positioned underneath to prevent the support from falling off the rod, and a second nut is tightened down from above by applying pressure to lock the support against vertical movement along the rod.

In order to install the connector, the second nut is turned in a direction to raise the nut up the rod to provide clearance between the nut and the support. The connector is then inserted between the nut and the support in a manner where the connector slot of the connector receives the rod. The retaining clip is then associated with the rod so that the rod retaining slot receives the rod. Then the retaining clip is lowered so that its angle tabs are received by their respective tab receiving slots of the connector, and the retaining slot of the retaining clip overlays the connector slot of the connector to form the aperture around the rod.

To secure the connector, the second nut is turned in the opposite direction to positively secure and clamp the connector and the retaining clip between the nut and the support. The brace is then attached to the connector's force transmitting member which extends toward the overhead structure at a predetermined angle. The force transmitting member is provided with a pair of holes to secure it to the brace using a pair of nut and bolt fastener combinations. And finally the brace at its other end is secured to the overhead structure using the bracket member.

The connector of the present invention is preferred over the prior connectors because it can easily and quickly be attached to an already existing suspended system. As a result, the connector reduces the labor and safety concerns associated with prior connectors which required that the system either be unsupported to insert the threaded rod through a hole in the connector or that a brace be welded directly to a member of the suspended system. These prior methods are very costly, inefficient and unsafe, thus undesired by the industry.

BRIEF DESCRIPTION OF THE DRAWINGS

Other objects and advantages of the invention will become apparent upon reading the following detailed description and upon reference to the drawings, in which.

DETAILED DESCRIPTION OF THE INVENTION

Figures 5, 5A:
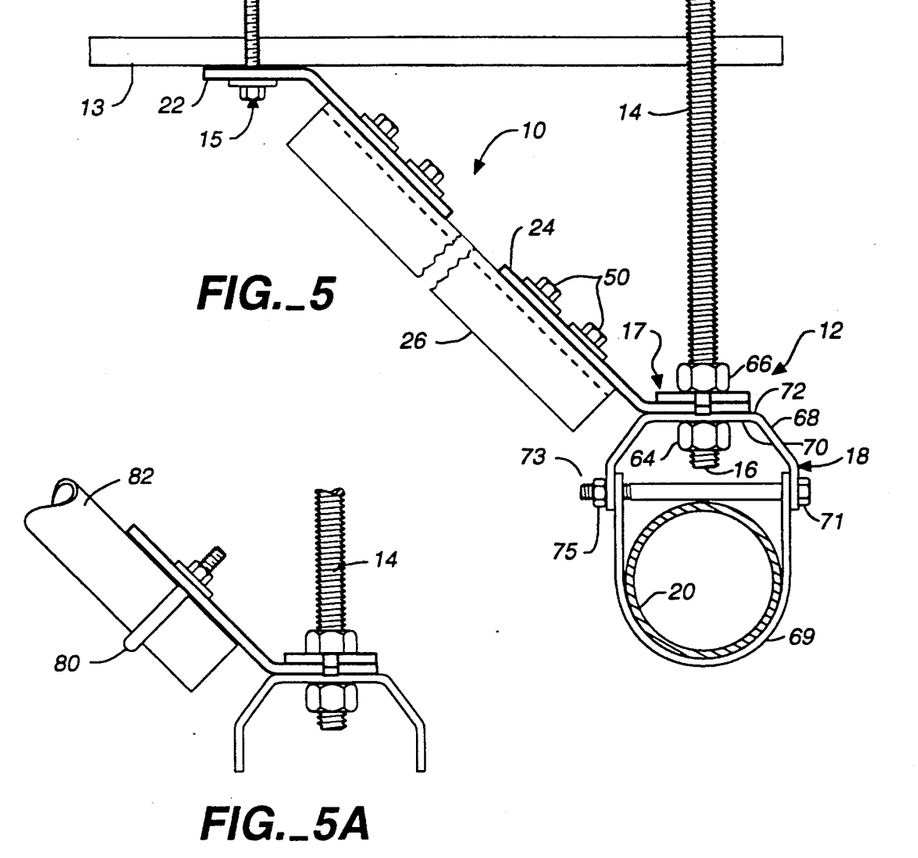
FIG. 5 is an elevational view of the seismic connector of FIG. 1 used in a seismic brace preventing oscillation of a suspended hanger system.
FIG. 5A is an elevational view of an seismic connector embodying features of the present invention when attached to the brace assembly in an alternate fashion.

Turning first to FIG. 5, a suspended system 12 is suspended from a support or rod 14 attached to an overhead structure 13 which extends vertically down to a free end 16. At the free end 16, a hanger 18 is attached to engage and maintain electrical and mechanical utility system elements 20 of the suspended system 12. As shown, the support 18 here is a clevis hanger engaging and maintaining mechanical piping 20. Many systems have been installed including the support rod 14 and hanger 18. Experience has revealed that these systems may be unsafe if not provided with additional bracing against horizontal oscillation. Accordingly many building codes have been modified to require the addition of seismic braces to these existing systems.

A lateral brace or seismic brace 10 of the present invention is shown used to brace the suspended system 12 against oscillation in the horizontal direction. The brace 10 has at an upper end 15 a bracket 22, and at a lower end 17 a connector 24. Connector 24 attaches the brace 10 to the suspended system 12 either adjacent or at the clevis hanger 18, and bracket 22 attaches the brace 10 to the overhead structure 13. A channel 26 extends between bracket 22 and the connector 24 to provide an interconnection to dissipate any external force acting upon the suspended system 12 to the overhead structure 13 to prevent oscillation.

It is common in traditional connectors for seismic bracing to have a hole for receiving the threaded rod in order to attach the connector to the suspended system. However, these traditional connectors do not effectively and efficiently facilitate attachment to an already installed system because the hanger 18 would have to be removed to extend the rod through the hole of the traditional connector. Connecter 24 (FIG. 1) of the present invention provides an easy and safe connector for attaching a seismic brace to an already existing suspended system without having to remove the hanger 18.

Figure 1:
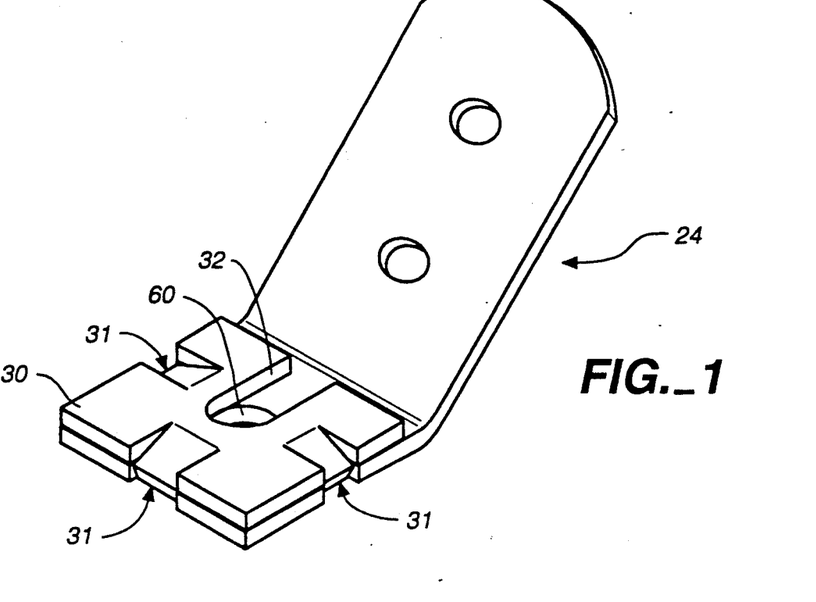
FIG. 1 is a perspective view of a seismic connector of the present invention.

Referring now to FIG. 1, the preferred connector 24 has generally a rectangular configuration formed from a thin plate of metal with an opening known as a connector slot or rod receiving slot 28 (FIG. 3) formed in one end to receive the rod 14 of the suspended system 12. To close the connector slot 28, a closure means or retaining clip 30 (FIG. 2) is associated with the connector 24 to insure that the rod 14 remains in the connector slot 28 of the connector 24. For the purpose of providing an aperture in the connector 24 that will snugly receive the rod 14, the retaining clip 30 is provided with a rod retaining slot 32 which when properly overlaid or superimposed with the connector slot 38, as shown, cooperates to form an aperture 60 through which the rod 14 extends (FIG. 5).

For the purpose of maintaining the proper overlay or engaged arrangement forming aperture 60, the connector 24 and retaining clip 30 have a positive interlocking engagement therebetween at 31 to prevent the connector slot 28 and the retaining slot 32 from shifting out of their proper positions during and at anytime after the connector 24 has been installed. The interlocking engagement 31 further guarantees that the retaining clip 30 is installed in proper orientation. As will be described, when the overlay of the connector slot 28 and retaining slot 32 is done in a proper manner, their respective slots are co-extensively positioned to open in opposite directions.

Returning to FIG. 5, the brace 10 is easily and safely mounted to an already existing suspended system. The connector 24 is attached easily to the rod 14 without having to disassemble and remove the support 18 from the rod 14 to extend the rod 14 through the aperture 60. The aperture 60 is formed around the rod 14 by engaging the connector 24 with the rod 14 in the connector slot 28 and by closing the slot 28 by overlaying the retaining clip 30 onto the connector 24.

Figures 2, 3:
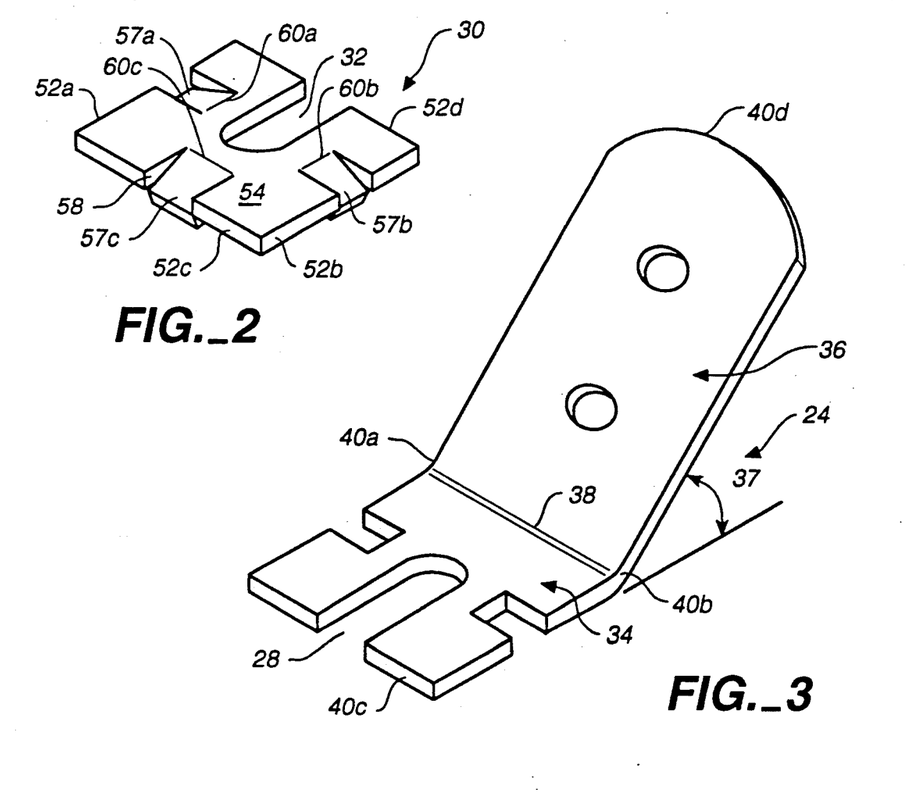
FIG. 2 is a perspective view of a retaining clip of the present invention.
FIG. 3 is a perspective view of the connector of the present invention.

Turning now to FIG. 3, the connector 24 is cut or formed from a thin metal plate to have a generally rectangular configuration having four edges 40a, 40b, 40c 40d. A bend line 38 separates connector 24 into two sections 34, 36 which are the attachment member 34 and the force transmitting member 36. Bend line 38, which is generally formed by a brake press machine, extends parallel and intermediate the distally separated edges 40c, 40d of the connecter 24. The connector 24 is bent at an angle 37 which positions the force transmitting member 36 at a 45 degree angle upward from a plane containing the attachment member 34. This enables the force transmitting member 36 to attach to the channel 26 to transmit the restraining force acting upon the suspended system 12 from the overhead structure at this desired angle 37.

Figure 4:
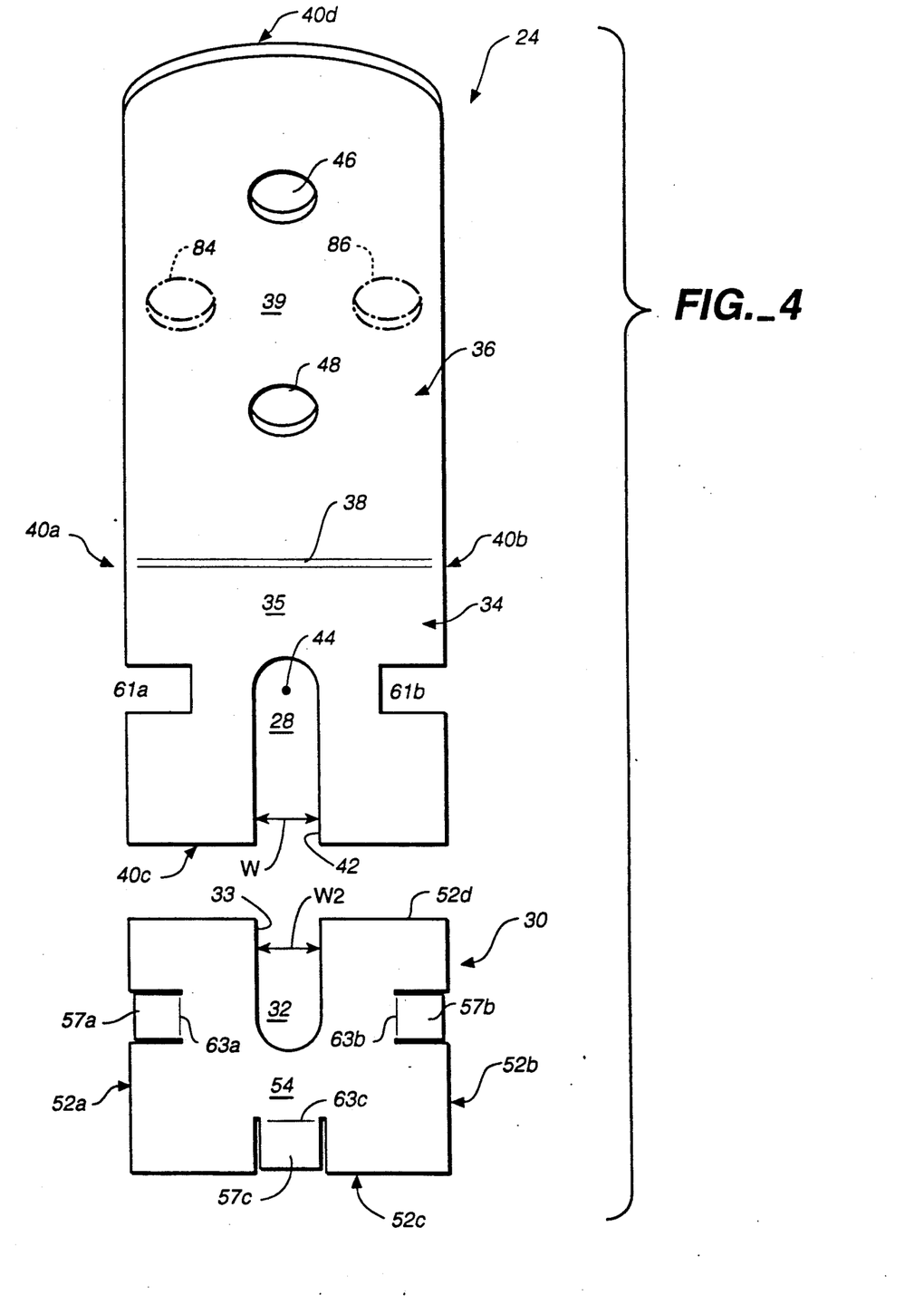
FIG. 4 is an exploded top plan view of the seismic connector of FIG. 1.

Referring now to FIG. 4, the force transmitting member 36 also has a rectangular configuration having a substantially continuous planar surface 39 with a pair of holes 46, 48 for attaching the connector 24 to the channel member 26 equally spaced in the longitudinal direction between the distal edge 40d and bend 38 and centered in the lateral or transverse direction. Connector 24 is fastened to the interconnecting channel 26 (FIG. 5) using a pair of nut and bolt combinations 50, whereby each of the bolts is passed through each of the holes 44, 46 of the connector 24 to be received by a similar pair of holes in the channel 26, and then each of the bolts is secured by its nut which is tightened to secure the connector 24 to the channel 26.

Figures 7, 8:
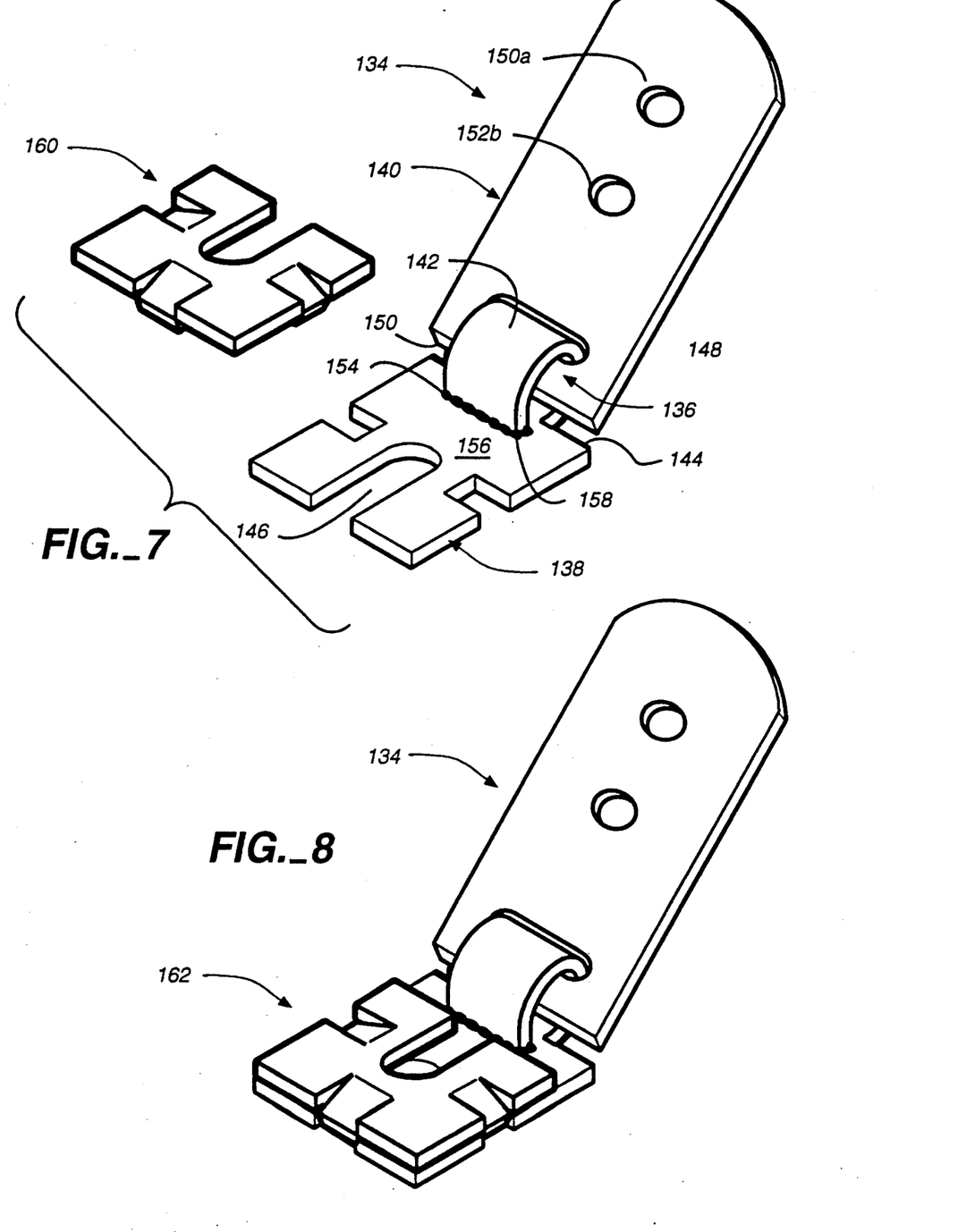
FIG. 7 is an exploded perspective view of an alternate connector embodying features of the present invention.
FIG. 8 is a perspective view of the connector of FIG. 7.

As shown in FIG. 7, an alternate connector 134 embodiment, substantially like that of connector 24, differs primarily in that a hinge means 136 connects the connector's 134 attachment member 138 to its force transmitting member 140. The hinge 136 enables the force transmitting member 140 to sit at a range of angles with respect to the plane containing the attachment member 138. Thus, connector 134 is not restricted to one particular angle per connector. The attachment member 138 has a rectangular configured hinge loop forming member 142 extending from edge 144 located opposite slot 146. The force transmitting member 140 has an oval shaped aperture 148 extending near and parallel to edge 150 located distally from holes 152a, 152b used to attach connector 134 to the brace. The aperture 148 is designed to loosely receive the hinge loop forming member 144. Once the hinge loop forming member 144 is extended through the aperture 148, it is bent in a circular manner continuing until its edge 154 located distally from slot 146 abuts the attachment member's surface 156 near edge 146 at a location so not to interfere with the retaining clip's 160 proper association thereon the attachment member 138 indicated by reference 162. The edge 154 of the hinge forming loop member 142 is secured to the surface 156 using preferably a weld 158. As will be described in the following detailed description, the retaining clip 160 and its association with the connector 134 is parallel to the description relating to connector 24.

Attachment member 34 has a generally square configuration with a planar surface 35 bordered on opposing sides by edge 40c and bend 38. The surface 35 is substantially co-extensive with the retaining clip 30 which is engageable thereon. The rod receiving slot 28 is formed with at least a width "w" sufficient to receive rod 14 therein and is cut or punched to extend inwardly from edge 40c having an open end 42. When rod 14 is received therein, the axis of rod 14 is generally located at a center position 44 as shown in FIG. 4.

Turning now to FIGS. 2 and 4, the retaining clip 30 has a generally square shape cut or formed from a thin metal plate to have four edges 52a, 52b, 52c, 52d and a planar surface 54. A retaining slot 32 is cut to extend inwardly from edge 52d sufficiently so that when the retaining clip 30 is associated with rod 14, rod 14 is maintained with its axis at the position 44 of the attachment member 34 of connector 24. As so far described, the retaining slot 32 is substantially similar to the connector slot 28 of the connector 24; however, the two differ primarily in that the retaining slot 32 has a width "w2" which is wider than the width "w" of the connector slot 28 of the connector 24. The purpose of this wider slot in the retaining clip 30 is to allow the retaining clip 30 to be used with a variety of connectors like connector 24 but each having different widths of connector slots to receive rods 14 with different diameters tightly therein. However, this width "w2" is designed only to cover a small range of connector slot widths because if it was designed to accommodate too large a variety of rod diameters, it would not be possible to provide a sufficiently accurate aperture to securely restrain the rod 14 and the system against oscillation.

As indicated above, in order to attach the connector 24 to the rod 14, the connector slot 28 and the retaining slot 32 form an aperture 60 through which rod 14 extends, and the aperture 60 is formed by co-extensively overlaying the retaining slot 32 on the connector slot 28 with their open ends 33, 42, respectively, facing in opposite directions. To accomplish this objective, the retaining clip 30 is positioned with its retaining slot 32 facing in the opposite direction as the connector slot 28, and then it is lowered down on the attachment member 34 to engage the retaining clip 30 with surface 35 of the connector element 24. All the edges of the retaining clip 30 and the attachment member 34 are substantially aligned as shown in FIG. 1.

To provide the interlocking engagement at 31 of FIG. 1 between the connector 24 and the retaining clip 30 to maintain accurately aperture 60, the connector 24 has a plurality of slots 61a, 61b designed to receive downward angle tabs of the retaining clip 30. This interlocking engagement at 31 is necessary during installation to orientate the retaining clip 30 with respect to the connector 24 and to maintaining there proper engagement until the installation is completed.

As can be seen from the following description by turning once again to FIGS. 2 and 4, the interlocking engagement at 31 includes the retaining clip 30 with three angle tabs 57a, 57b, 57c formed from the three edges 52b, 52c, 52d and the surface 54 adjacent thereof. Each angle tab 57a, 57b, 57c is sheared from the retaining clip surface 54 to have a generally rectangular shape which angles out of the plane of the retaining clip 30. More specifically, the angle tabs 57a, 57b are formed at opposite edges 52b, 52d adjacent the retaining slot 32. The third angle tab 57c is located at the edge 52c which is opposite the rod retaining slot 32. The angle 58 (FIG. 2) at which each angle tab 57a, 57b, 57c extends downward with respect to the retaining clip's surface 54 is 45 degrees. Each tab 57a, 57b, 57c extends downward from a bend 63a, 63b, 63c running parallel to its respective forming edge at a location receded from the same edge. More specifically, each of the bends 63a, 63b, 63c is located at a position intermediate the respective forming edge 50a, 50b, 50c and the retaining slot 32. Each angle tab 57a, 57b, 57c has a width less than half a length of its respective forming edge and has a length equal to the distance between its respective forming edge and its respective bend 63a, 63b, 63c. Each tab bend 63a, 63b, 63c also is generally centered between the two edges adjacent the respective forming edge from which the angle tab is formed.

For example, angle tab 57b is stamped or sheared from the surface 54 and edge 52b to sit downward at a 45 degree angle with respect to a plane containing surface 54. The angle tab 57b is bent at bend 63b located intermediate the retaining slot 32 and the edge 52b. The width of tab 57b is less then the length of the respective forming edge 52b, and the length extends from the bend 63b to the respective forming edge 52b.

To cooperate with each of the angle tabs 57a, 57b, 57c to provide the interlocking engagement at 31 between the connector 24 and the retaining clip 30, the attachment member 34 of the connector 24 has cut out of its surface 35 and the edges 40a, 40b adjacent the connector slot 28 a pair of tab receiving slots 61a, 61b having similar shape as the retaining clip's angle tabs 57a, 57b located adjacent its retaining slot 32. And a third angle tab 57c is designed to be received by a portion of the connector slot 28 near the open end 42 which is not occupied by the rod 14, and this third tab 57c is generally wider than the other two tabs because the connector slot 28 is being used in connection with the interlocking engagement at 31, and it is required that the connector slot 28 be wider than the tab receiving slots 61a, 61b to receive the rod 14. Tab 57c further insures that the retaining clip 30 is installed in the correct orientation, thereby, having the connector slot 28 and the retaining slot 32 facing in opposite directions because only the connector slot 28 can receive the wider tab 57c. Each tab receiving slot 61a, 61b extends perpendicular from its respective forming edge 40a, 40b to an intermediate position therebetween the same and the connector slot 28. This position is generally similar to the bend location of the angle tabs 57a, 57b, 57c of the retaining clip 30. The similar positioning and sizing facilitates receiving each of the angle tabs in a tight or snug fit manner as shown in FIG. 1 at 31.

In carrying out the invention, the connector 24 is easily and quickly installed to brace an already existing suspension system 12. The rod 14 supports the mechanical pipe 20 in a hanger or clevis hanger 18. The hanger 18 consists of an upper member 68 used to attach the hanger to the rod 14 using a pair of nuts 64, 66 and a lower member 69 to support the pipe 20 therein. The upper and lower members 68, 69 are generally U-shaped straps of metal where their ends are connected in a hinge fashion using a rod or bolt 71 to extend therebetween. To suspend the support, the rod 14 extends through a hole in the upper hanger member 68 of the hanger, and nut 64 is screwed on the rod from below the upper hanger member 68 to abut the upper hanger member's underside 70 to prevent the hanger 18 from falling off the rod 14. Nut 66 positioned on the rod 14 above the upper hanger member 68 to abut the upper hanger member's top side 72 of the same to prevent the support against vertical displacement of the support along the rod 14.

To attach the connector 24 to the system 12, the upper nut 66 is unscrewed a distance upward along rod 14 to a location which provides sufficient clearance between nut 66 and the upper member 68 to allow for insertion of connector 24 therebetween. For associating the connector 24 with the rod 14 and support 18, it is first oriented to have its force transmitting member 36 extending upward and to have its connector slot 28 horizontally positioned with its open end 42 positioned to receive the rod 14 therein. Next, the connector 24 is engaged with the rod 14 between the nut 66 and the upper member 68. The connector slot 28 receives an exposed portion of the rod 14 which is created between the nut 66 and the upper member 68 so that the axis of rod 14 is located at the center 44 (FIG. 4) of the connector's attachment member 34. To close the connector slot 28, the retaining clip 30 is orientated so to have its retaining slot 32 horizontally facing opposite the connector slot 28, and its angle tabs 57a, 57b, 57c extending downward. The retaining clip 30 is then engaged with the rod 14 between the connector 24, and the nut 66 to receive the exposed rod portion and to co-extensively overlay the retaining slot 32 on the connector slot 28 to form the aperture 60 through which the rod 14 extends. The retaining clip 30 is then, lowered down onto surface 35 of the connector segment 34 with the tab receiving slots 61a, 61b receiving the angle tabs 57a and 57b and with the connector slot 28 receiving the wider third angle tab 57c. Then the nut 66 is tightened down to clamp the retaining clip 30 and the connector 24 tightly together between the nut 66 and the upper member. This interlocking engagement at 31 is best seen in FIG. 1. If desired, the retaining clip 30 can be oriented with its angle tabs facing upward and associated with the other side of the connector which is between the upper hanger member 68 and the connector 24.

Once the connector 24 is secured to rod 14, the connector 24 is attached to the channel 26 of the brace 10 assembly by way of the nut and bolt combination 50 consistent with the described fastening procedure using combination 50. As shown in 5A, the connector alternatively can be attached to the brace assembly using a U-bolt 80 connection where the interconnecting member is a tubular member 82 of metal or plastic. In order to use the U-bolt 82, the connector 24 has a pair of alternately positioned holes 84, 86 (FIG. 4) to facilitate this attachment. Holes 84, 86 are equally spaced transversely across the connectors force transmitting member 36 at a position intermediate one of the distally spaced edges 40d of the connector 24 and the bend 38.

Alternatively in FIG. 5, the connector 24 could be attached to the rod or bolt 71 which hinges the upper and lower hanger members 68, 69 together at an outer end 73. This generally requires that the connector 24 be inserted with the connector slot 28 facing downward and the force transmitting member 36 extending upward in order to attach the connector to the channel 26. The retaining clip 30 then is properly oriented to have its retaining slot 32 facing upward thereby in the opposite direction as the connector slot 28. Once oriented, the retaining clip 30 is inserted either between the connector 24 and the support 18 or between a nut 75, which is screwed to the bolt 71 to prevent the upper and lower hanger members 68, 69 from coming apart, and the connector 24. Once the retaining clip 30 is in its assembly position, the nut 25 is tightened to clamp the retaining clip 30 and connector 24 together to securely attach the connector 24 to the support or hanger 18.

Figure 6:
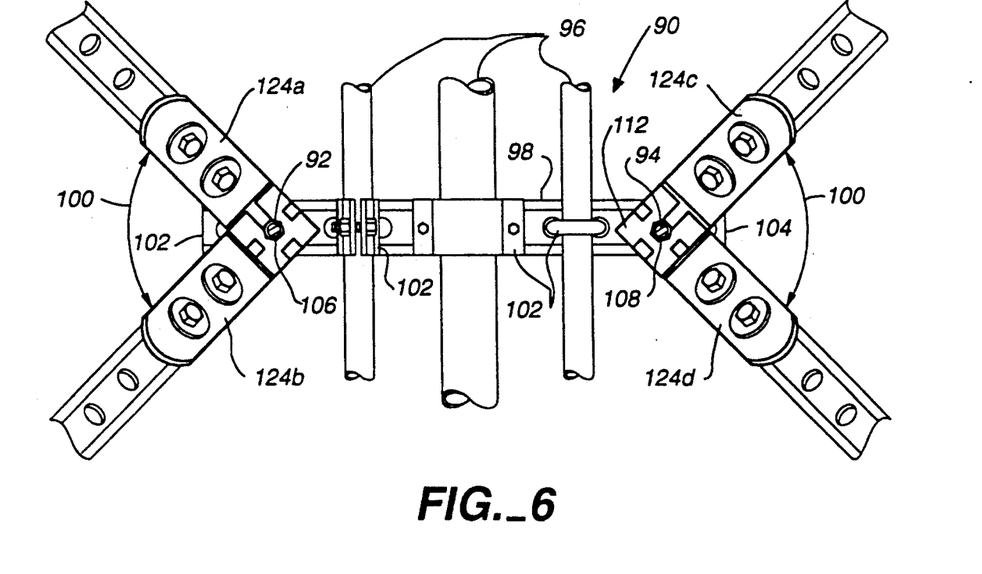
FIG. 6 is a top plan view of a plurality of seismic connectors of FIG. 1 stacked in pairs in a bracing arrangement to prevent oscillation of a suspended trapeze system.

Turning to FIG. 6 to demonstrate another suspended system being braced against oscillation utilizing a plurality of connectors 124a, 124b, 124c, 124d in accordance with the invention, a trapeze arrangement 90 is suspended from a pair of rods 92, 94 from an overhead structure vertically downward to attach each to a beam or channel 98. The rods 92, 94 attach to channel 98 near its ends 102, 104, respectively. The conduit is supported from the channel 98 using fastening means 102. Attached to each rod 92, 94 are a pair of braces having an angle 100 therebetween. The angle 100 positions the braces at a arrangement which prevents oscillation in both the longitudinal and transverse direction. As shown, each pair of connectors 124a, 124b and 124c, 124d has its two connectors stacked one on top of the other to restrain the rods 92, 94, respectively, at their respective ends 102, 104 of the channel 98. The braces are easily attached using connector 124, embodying features of the present connector 24, to any threaded rod containing at least one nut.

For example to attach the pair of connectors 124c, 124d adjacent end 104 of the channel 98, the connectors 124c, 124d are both installed between the channel 98 and nut 108 located on rod 94 to preventing vertical displacement of the channel 98 along the rod 94. To stack the connectors 124c and 124d between rod 94 and nut 108, connector 124c can be installed first to receive the rod 94, and then its retaining clip is associated thereon. Next, the second connector 124c is stacked on top of the retaining clip of first connector 124d and its retaining clip 112 is associated thereon. The pair of connectors 124c, 124d are then set to their desired angle 100 with respect to one another, and the nut 108 is tightened down to secure and clamp the connectors 124c, 124d and their respective retaining clips consistent with the teachings of this invention. The braces and connectors 124a, 124b are installed with rod 92 between nut 106 and the channel 98 adjacent the other end 102 in the same manner. There is no restriction on the number and order of connectors used in the stacking arrangement other than that there be enough threaded rod exposed to attach to securely the connector.

Thus it is apparent that there has been provided, in accordance with the invention, a connector that fully satisfies the objects, aims, and advantages set forth above. While the invention has been described in conjunction with the specific embodiments thereof, it is evident that many alternatives, modifications, and variations will be apparent to those skilled in the art in light of the foregoing descriptions. Accordingly, it is intended to embrace all such alternatives, modifications, and variations as fall within the spirit and broad scope of the appended claims.

What is claimed is:

1. A device to provide lateral bracing between a support element and a structure, said device comprising a lateral brace extending from said support element toward means to connect said lateral brace to said structure, said lateral brace including a first opening intersecting an edge thereof, said first opening dimensioned to receive and partly surround said support element, a closure element having a second opening intersecting an edge thereof, said second opening dimensioned to receive and partly surround said support element, first interlocking means on said lateral brace and second interlocking means on said closure element, said first interlocking means being engagable with said second interlocking means to prevent relative motion between said lateral brace and said closure element when said lateral brace opening and said closure element opening are positioned to surround said support element, and means to hold said lateral brace and said closure element with their respective interlocking means engaged.

2. The device of claim 1 wherein said first opening and said second opening are slots.

3. The device of claim 1 wherein one of said first and second interlocking means is a recess and the other is a projection dimensioned to be received in said recess.

4. The device of claim 1 wherein said means to connect to said structure comprises an element extending from said first surface, upwardly and at an obtuse angle, whereby said device is connectable to a ceiling of said structure.

5. The device of claim 1 wherein said lateral brace comprises a plurality of different interlocking means, said closure element comprises a plurality of different interlocking means, the different interlocking means being engagable when the openings in said lateral brace and said closure element are oriented to surround said support elements.

* * * * *